United States Patent [19]

Poirier

[11] Patent Number: 4,617,062
[45] Date of Patent: Oct. 14, 1986

[54] ROOFING ASPHALT COMPOSITIONS CONTAINING HYDROCRACKED PITCH

[75] Inventor: Marc-Andre Poirier, Ottawa, Canada

[73] Assignee: Her Majesty in right of Canada as represented by the Minister of Energy, Mines and Resources, Ottawa, Canada

[21] Appl. No.: 733,781

[22] Filed: May 14, 1985

[51] Int. Cl.$^4$ ............................................. C08L 95/00
[52] U.S. Cl. ................................ 106/273 R; 106/284; 208/23
[58] Field of Search .............. 106/273 R, 284; 208/23

[56] References Cited

U.S. PATENT DOCUMENTS

| | | | |
|---|---|---|---|
| 3,374,104 | 3/1968 | Baum et al. | 106/273 |
| 3,462,359 | 8/1969 | Fauber | 208/23 |
| 3,986,887 | 10/1976 | Pitchford | 106/273 |
| 4,268,318 | 5/1981 | Stone | 106/284 |
| 4,373,961 | 2/1983 | Stone | 404/72 |

*Primary Examiner*—Amelia B. Yarbrough
*Attorney, Agent, or Firm*—Wegner & Bretschneider

[57] ABSTRACT

The present invention relates to a roofing grade asphalt composition which comprises a blend of (a) a petroleum pitch obtained as a residue in the hydrocracking of hydrocarbon oils and (b) as a diluent therefor preferably a paving grade asphalt cement of 150–200 penetration.

8 Claims, No Drawings

ROOFING ASPHALT COMPOSITIONS CONTAINING HYDROCRACKED PITCH

BACKGROUND OF THE INVENTION

This invention relates to bituminous compositions and, more particularly, asphaltic compositions which are suitable for use as roofing materials.

Asphalt is a natural constituent of crude oils and is typically produced from the distillation residues of refining feedstocks. This product is of very significant industrial importance since it is widely used in the construction of roads, building materials and other industrial applications. This asphalt has normally been obtained from conventionl petroleum oils.

With the changing economics of the petroleum industry, there is a trend toward the conversion of heavy hydrocarbon oils, such as the distillation residues, to light and intermediate naphthas of good quality for reforming feedstock, fuel oil and gas oils. These residues represent the normal sources of asphalts.

Roofing asphalts are also obtained from distillation residues, but normally require considerable air blowing to attain the desired properties for binding, adhesion, water proofing etc. Diverse applications of air blown bitumen have resulted in the development of standard specifications for various uses.

Asphalt specifications for roofing purposes are given in Table I below:

TABLE I

| Property | Asphalt requirements for roofing purposes | | | | | |
|---|---|---|---|---|---|---|
| | Type 1 | | Type 2 | | Type 3 | |
| | Min. | Max. | Min. | Max. | Min. | Max. |
| Softening Point (R & B, °C.) | 60 | 68 | 75 | 83 | 90 | 98 |
| Flash Point (C.O.C. °C.) | 230 | — | 230 | — | 230 | — |
| Penetration | | | | | | |
| 0° C., 200 g, 60 s | 10 | — | 10 | — | 8 | — |
| 25° C., 100 g, 5 s | 30 | 45 | 20 | 30 | 15 | 25 |
| 45° C., 50 g, 5 s | — | 160 | — | 80 | — | 55 |
| Thin film oven test pen., % of original | 80 | — | 80 | — | 80 | — |
| Loss of volatiles, % | — | 1.0 | — | 1.0 | — | 1.0 |
| Solubility in trichloroethylene, % | 99 | — | 99 | — | 99 | — |

It is the object of the present invention to develop a blended roofing asphalt which can utilize unwanted processing residues, while avoiding the need of the costly air blowing process.

SUMMARY OF THE INVENTION

In accordance with this invention, it has been found that an asphalt product matching the characteristics of the traditional air blown residues can be produced by blending (a) a petroleum pitch obtained as a residue in the hydrocracking of hydrocarbon oils and (b) as a diluent therefor a vacuum residuum with a penetration of 60-400, preferably a paving grade asphalt cement.

DETAILED DESCRIPTION

The pitches that are used in the present invention are residues of hydrocracking which usually boil above 524° C. and they may come from the hydrocracking of regular crude oils or from the hydrocracking of heavy hydrocarbon oils, including heavy bituminous oils extracted from tar sands. While the pitches which can be used may be derived from processes providing a wide range of pitch conversions, they are usually derived from processes having a pitch conversion of at least 40% and preferably in excess of 80% pitch conversion, such as that described in Canadian Pat. No. 1,151,579, issued Aug. 9, 1983.

The diluents are preferably paving grade asphalt cements. Typical asphalt cement specifications for road paving purposes are given in Table 2 below:

TABLE 2

| | Asphalt cement specifications for road purposes (16-GP-3M) | | | | | | |
|---|---|---|---|---|---|---|---|
| Grade | 85–100 | | 120–150 | | 150–200 | | ASTM |
| Requirements | Min. | Max. | Min. | Max. | Min. | Max. | Method |
| Penetration (25° C., 100 g, 5 s) | 85 | 100 | 120 | 150 | 150 | 200 | D 5 |
| Flash point (CO C, °C.) | 230 | — | 220 | — | 220 | — | D 92 |
| Ductility (25° C., 5 cm/min, cm) | 100 | — | 100 | — | 100 | — | D 113 |
| Thin film oven test (Pen. of residue % of original Pen.) | 47 | — | 42 | — | 40 | — | D 1745 |
| Solubility in Trichloroethylene (wt %) | 99.0 | — | 99.0 | — | 99.0 | — | D 2042 |

It is preferable to use a road asphalt of 150–200 penetration, although it is possible to use some asphalt of 85–100 penetration. However, softer grade road asphalt of 200 penetration is not suitable because physical properties such as softening point and penetration cannot be raised sufficiently to meet Type 1 roofing asphalt specifications.

The processed pitch and the paving grade asphalt cement can be blended in widely varying proportions, provided the resulting blend meets the specifications of Table 1. However, the composition of this invention is particularly valuable in its ability to accept large proportions of pitches derived from high pitch conversion processes. Preferably at least 25% processed pitch is utilized in the compositions of this invention. According to a particularly preferred embodiment, at least 30% by weight of a pitch obtained from a greater than 80% pitch conversion process is combined with a 150–200 penetration road asphalt cement.

Throughout this specification, certain terms of art are used which are defined as follows:

Deasphaltening

The asphaltene portion was precipitated by the addition of twenty volumes of n-heptane to one volume of asphalt blend. The slurry was agitated for 15 min. in a ultrasonic bath and the asphaltenes (n-heptane insolubles), were separated by filtration on a Whatman filter paper (No. 1). The asphaltenes were washed with 10 volumes of n-heptane, dried at 50° C. under reduced pressure. The maltenes (n-heptane solubles) and washings were combined and the solvent removed using a Buchi-Rotavapor. The asphaltenes obtained by this method would also contain the toluene insolubles.

Compound Type Separation

The deasphaltened blend (about (1.4 g) was separated into compound-type concentrates of saturates, monodiaromatics, polynuclear aromatics and resins on a dual packed silica-gel alumina column. The column consists of a vertical stainless steel tube (137×1.25 cm o.d.) packed in its lower half with 37 g of activated silica gel D-12 and top half with 47 g of activated alumina F-20. The following eluant sequence was used to elute the corresponding compound-type concentrates: n-pentane (330 mL), n-pentane/benzene 10% (500 mL), benzene/ethyl acetate 5% (130 mL) and methanol (200 mL) followed by benzene (100 mL) and 100 mL of pentane. A Lapp pump LS-30 was used with a flow rate of about 5 mL/min.

Molecular Weight Determination by Gel Permeation Chromatography

The Gel Permeation Chromatography (GPC) work was performed on a Beckman Model 112 High Performance Liquid Chromatograph. The molecular weight determination were made using two GPC systems—one system using 500 Å and 100 Å Ultrastyragel columns (Waters Associates) in series and other systems with 1000 Å and 100 Å Ultrastyragel columns in series. Tetrahydrofuran (THF) (Burdick and Jackson "distilled in glass") was used at 1 mL/min. flow rate as mobile phase. The concentrations of the samples in THF were limited to 0.1–0.25% in order to avoid "concentration effects" on the retention results. The column eluate was monitored with a Schoeffel Model SF770 UV-vis detector operating at 254 nm and the data were recorded on a Spectra Physics SP4100 printer plotter.

Elemental Analysis and Physical Tests

The samples were analyzed for C, H, N on a Perkin Elmer model 240 Analyzer and the sulphur was determined on a LECO.

The physical tests, viscosity, penetration, ductility, solubility in trichloroethylene and softening point were performed according to the ASTM procedures.

Certain preferred features of the present invention will be better understood from consideration of the experimental data in the following examples.

EXAMPLE 1

A variety of blending products were prepared as follows:

Diluents

1. Asphalt cement, 150–200 penetration, obtained from Petro-Canada, Montreal East Refinery, composed of light Saskatchewan blend, Agha Jari, Mexican and other crude distillation residues.
2. Asphalt cement, 150–200 penetration, obtained from Petro-Canada, Taylor Refinery, B.C. composed of Boundary Lake and B.C. light distillation residues.
3. Asphalt cement, 150–200 penetration, obtained from another petroleum refinery.

Pitches

4. Light Arabian pitch, 76% pitch conversion (82-CG-37).
5. Blend 24 pitch, 87% pitch conversion (84-CG-210).
6. IPPL pitch, 80% pitch conversion (84-CG-216).

Type 1 Commercial Roofing Asphalts

7. Type 1 roofing asphalt, 30–45 penetration, obtained from Petro-Canada, Montreal East Refinery.
8. Type 1 roofing asphalt, 30–45 penetration, obtained from another petroleum refinery.

The above blending materials had the chemical analyses and physical properties shown in Tables 3 and 4 below:

TABLE 3

Ultimate analysis of processed residues and asphalt cements

| | Sample No. | | | | | |
|---|---|---|---|---|---|---|
| | 1 | 2 | 3 | 4 | 5 | 6 |
| Specific gravity 15/15° C. | 1.024 | 1.008 | 1.022 | 1.144 | 1.190 | 1.179 |
| Carbon, wt % | 84.19 | 86.62 | 83.66 | 84.06 | 84.2 | 83.98 |
| Hydrogen, wt % | 9.84 | 7.81 | 10.22 | 7.54 | 6.82 | 7.02 |
| Sulphur, wt % | 4.21 | 2.24 | 3.52 | 3.54 | 3.09 | 3.25 |
| Nitrogen, wt % | 0.53 | 0.65 | 1.04 | 1.20 | 1.43 | 1.28 |
| R.C.R., wt % | 19.0 | 19.9 | 16.8 | 45.4 | 57.9 | 57.7 |
| Heptane solubles, wt % | 80.6 | 91.5 | 84.0 | 52.3 | 42.5 | 45.0 |
| Heptane insolubles, wt % | 19.4 | 8.5 | 16.0 | 33.7 | 57.5 | 55.0 |
| Toluene insolubles, wt % | 0.3 | 0.4 | 0.1 | 6.0 | 25.8 | 22.4 |
| Vanadium, ppm | 514 | 243 | 157 | 231 | 1967 | 405 |
| Nickel, ppm | 87 | 82 | 73 | 156 | 310 | 236 |
| Ash, wt % | 0.09 | 0.05 | 0.04 | 0.95 | 3.49 | 5.69 |

TABLE 4

Physical properties of processes residues and asphalt cement

| | Sample No. | | | | | |
|---|---|---|---|---|---|---|
| | 1 | 2 | 3 | 4 | 5 | 6 |
| Penetration 25° C., 100 g, 5 s | 157 | 168 | 140 | 0 | 0 | 0 |
| Viscosity, 135° C. Kn, cSt | 217 | 205 | 240 | — | — | — |
| Softening Point (R & B, °C.) | 43 | 43 | 39 | 102 | 134 | 119 |
| Flash Point (C.O.C., °C.) | 310 | 332 | 330 | 327 | 340 | 340 |
| Solubility in trichloroethylene, % | 99.9 | 99.9 | 99.9 | 99.0 | 85.8 | 85.8 |

It will be seen from the physical properties that the blending materials by themselves are not suitable for road asphalts as they do not meet the specifications set out in Table 1 above.

BLENDING

Different blends were prepared using as one component of each blend one of the pitches described above and as the other component a diluent selected from the three asphalt cements. These blends were prepared to meet the Type 1 penetration specification of Table 1. The different amounts of pitch used in the different blends are set out in Table 5 below.

In the blending procedure used, the samples were preheated and conditioned to enable pouring and weighing. The components were then blended to achieve a penetration of 30–45 as required for a Type 1 roofing asphalt. The blend was then reheated on a hot plate at the softening point of the pitch for conditioning and agitating to yield a homogeneous mixture.

TABLE 5

Weight percent of processed residue in blend mixture to obtain Type 1 roofing asphalt

| Processed residue | Asphalt Cement | | |
|---|---|---|---|
| | 1 | 2 | 3 |
| 4 | 29* (38) | 29 (31) | 29 (35) |
| 5 | 24 (37) | — | 25 (32) |
| 6 | 26 (38) | — | — |

*Penetration is indicated in brackets.

The chemical analyses and the physical properties of six different blends that were prepared and two commercial roofing asphalts are shown in Tables 6 and 7 below.

TABLE 6

Ultimate analysis of blended roofing asphalts

| | Sample No. | | | | | | | |
|---|---|---|---|---|---|---|---|---|
| | 1-4 | 2-4 | 3-4 | 1-5 | 3-5 | 1-6 | 7 | 8 |
| Specific gravity 15/15° C. | 1.051 | 1.053 | 1.052 | 1.057 | 1.055 | 1.061 | 1.025 | 1.027 |
| Carbon, wt % | 85.50 | 86.45 | 84.67 | 84.63 | 84.13 | 83.86 | 85.21 | 84.19 |
| Hydrogen, wt % | 9.52 | 9.75 | 9.44 | 9.14 | 9.30 | 9.27 | 10.01 | 9.95 |
| Sulphur, wt % | 4.09 | 2.56 | 4.40 | 3.80 | 4.12 | 3.78 | 3.52 | 4.53 |
| Nitrogen, wt % | 0.62 | 0.72 | 0.54 | 0.78 | 0.74 | 0.69 | 0.63 | 0.37 |
| Heptane solubles, wt % | 74.2 | 83.3 | 77.9 | 73.9 | 71.4 | 72.1 | 74.6 | 72.8 |
| Heptane insolubles, wt % | 25.8 | 16.7 | 22.1 | 26.1 | 28.6 | 27.9 | 25.4 | 27.2 |
| Toluene insolubles, wt % | 0.2 | 0.2 | 0.2 | 1.7 | 1.4 | 2.5 | 0.1 | 0.1 |
| Vanadium, ppm | 355 | 175 | 115 | 1123 | 671 | 414 | 427 | 174 |
| Nickel, ppm | 66 | 55 | 59 | 176 | 140 | 129 | 108 | 78 |
| Ash, wt % | 0.04 | 0.05 | 0.06 | 0.53 | 0.98 | 1.23 | 0.08 | 0.04 |

TABLE 7

Physical properties of blended roofing asphalts

| | Sample No. | | | | | | | |
|---|---|---|---|---|---|---|---|---|
| | 1-4 | 2-4 | 3-4 | 1-5 | 3-5 | 1-6 | 7 | 8 |
| Penetration | | | | | | | | |
| 0° C., 200 g, 50 s | 15 | 11 | 15 | 15 | 12 | 14 | 19 | 21 |
| 25° C., 100 g, 5 s | 38 | 31 | 35 | 37 | 31 | 38 | 40 | 42 |
| 45° C., 50 g, 5 s | 162 | 166 | 191 | 155 | 134 | 164 | 123 | 125 |
| Viscosity at 135° C. Kn, cSt | 315 | 381 | 366 | 683 | 636 | 404 | 762 | 1097 |
| Softening point (R & B, °C.) | 55 | 57 | 52 | 57 | 56 | 56 | 61 | 62 |
| Flash point, °C. (C.O.C.) | >300 | >300 | >300 | >300 | >300 | >300 | >300 | >300 |
| Solubility in trichloroethylene, % | 99.9 | 99.9 | 99.8 | 98.3 | 98.6 | 97.6 | 99.9 | 99.9 |
| Thin film oven test Penetration, % of original | 83 | 83 | 82 | 82 | 81 | 85 | 80 | 81 |
| Loss on heating, % | 0.03 | 0.06 | 0.05 | 0.01 | 0.05 | 0.01 | 0.06 | 0.19 |
| Sweatability test Stability number | 0.747 | 0.404 | 0.368 | 1.282 | 0.402 | 0.618 | 0.802 | 0.586 |

It will be noted from the above tables that the H/C ratio of the blends are lower than the roofing asphalts, indicating that they are more hydrogen deficient. The n-heptane insolubles content of the blends are in the same range as the roofing asphalts. Typical roofing asphalts contain from 20 to 30 wt % of n-heptane insolubles. The toluene insolubles contents are relatively low and comparable to roofing asphalts. However, blends 1-5, 3-5 and 1-6 contain higher toluene insolubles because of the high toluene insolubles content of the corresponding pitches.

Table 7 shows two major differences in the physical properties of the blends compared with refinery asphalts. The softening points and the viscosity values are slightly lower. This can be explained by the lower molecular weight of the compound types as presented in Tables 8 and 9 below.

TABLE 8

Molecular weight distribution of processed residues and asphalt cements

| | Average Molecular Weight | | |
|---|---|---|---|
| Sample | Total Sample | Maltenes | Asphaltenes |
| 1 | 1600 | 1200 | 3320 |
| 2 | 1340 | 1230 | 2750 |
| 3 | 1575 | 975 | 4230 |
| 4 | 400 | 390 | 525 |
| 5 | 300 | 340 | 325 |
| 6 | 360 | 390 | 385 |

TABLE 9

Molecular weight distribution of blended asphalts

| | Average Molecular Weight | | |
|---|---|---|---|
| Sample | Total Sample | Maltenes | Asphaltenes |
| 1-3 | 1040 | 600 | 2530 |
| 2-4 | 760 | 640 | 1810 |

TABLE 9-continued

Molecular weight distribution of blended asphalts

| Sample | Average Molecular Weight | | |
|---|---|---|---|
| | Total Sample | Maltenes | Asphaltenes |
| 3-4 | 1120 | 690 | 2700 |
| 1-5 | 800 | 620 | 1380 |
| 3-5 | 940 | 670 | 1910 |
| 1-6 | 910 | 725 | 1530 |
| 7 | 2220 | 1080 | 7040 |
| 8 | 3690 | 1090 | 9760 |

Although the softening points are slightly lower than the minimum value of 60, the blends are still acceptable as supported by the sweatability results as shown in Table 7 above. The sweatability test allows the determination of the oils that have separated from the mixture in the roofing asphalt and low values indicate a better performance. It will be noted that blend 3-4 does not meet other specifications and, therefore, is not acceptable.

As shown in Table 8, the molecular weight of the pitches and corresponding asphaltenes are lower than 1,000. The molecular weight of the processing pitch decreased with increasing pitch conversion.

The major difference in the blends of this invention compared to air-blown asphalts is the molecular weight. As shown in Table 9, the molecular weight of the asphaltenes in the blends ranges from 1380 to 2700 compared with from 7040 to 9760 in the air-blown asphalts. This trend is observed both for the total sample and the maltenes. Lower molecular weight does not seem to affect the performance as shown by the TFOT and sweatability results. Therefore, the results suggest that the physical properties except viscosity and softening point are mainly governed by the asphaltene content rather than the molecular weight.

The chemical composition of asphalts is important since it determines the rheological properties. The compound-type distribution results of the processed residues and asphalts cements are presented in Tables 10 and 11 below.

TABLE 10

Compound-type distribution of processed residues and asphalt cements (n-heptane solubles, wt %)

| Sample | Saturates | Mono-diaromatics | Polyacromatics | Resins |
|---|---|---|---|---|
| 1 | 19.1 | 21.4 | 26.0 | 33.5 |
| 2 | 24.5 | 23.1 | 28.5 | 23.0 |
| 3 | 23.1 | 20.2 | 27.0 | 29.7 |
| 4 | 11.8 | 11.0 | 30.1 | 47.1 |
| 5 | 22.5 | 7.9 | 33.9 | 35.7 |
| 6 | 22.4 | 8.2 | 34.4 | 35.0 |

TABLE 11

Compound-type distribution of processed residues and asphalt cements (wt %)

| Sample | Saturates | Aromatics | Resins | *Asphaltenes |
|---|---|---|---|---|
| 1 | 15.5 | 38.3 | 27.1 | 19.1 |
| 2 | 23.4 | 47.4 | 21.1 | 8.1 |
| 3 | 19.4 | 39.7 | 29.7 | 16.0 |
| 4 | 7.8 | 27.3 | 31.2 | 33.7 |
| 5 | 9.6 | 17.7 | 15.2 | 57.5 |
| 6 | 10.1 | 19.2 | 15.7 | 55.0 |

*Asphaltenes correspond to the n-heptane insolubles content.

The results in Table 10 in the n-heptane soluble portion of the processed residues shows less saturates and monodiaromatics contents compared with the asphalt cements. The resin content is also higher for the pitches. However, the polynuclear aromatics content is about the same. Table 11 shows a higher asphaltene content for the pitches. Mixing of the pitches with the asphalt cements results in increasing the viscosity of the mixture and lowering of the average molecular weight.

The compound-type distribution of the blended samples of this invention is given in pages 12 and 13 below.

TABLE 12

Compound-type distribution of blended roofing asphalts (n-heptane solubles, wt %)

| Sample | Saturates | Mono-diaromatics | Polyaromatics | Resins |
|---|---|---|---|---|
| 1-4 | 21.7 | 21.4 | 27.7 | 29.2 |
| 2-4 | 20.9 | 22.5 | 28.6 | 28.0 |
| 3-4 | 21.6 | 17.3 | 29.8 | 31.3 |
| 1-5 | 22.5 | 19.2 | 27.5 | 30.8 |
| 3-5 | 21.3 | 18.6 | 30.0 | 30.1 |
| 1-6 | 18.6 | 19.6 | 28.4 | 33.4 |
| 7 | 26.4 | 22.0 | 26.2 | 25.4 |
| 8 | 27.2 | 22.6 | 28.1 | 22.1 |

TABLE 13

Compound-type distribution of blended roofing asphalts (wt %)

| Sample | Saturates | Aromatics | Resins | Asphaltenes |
|---|---|---|---|---|
| 1-4 | 16.1 | 36.4 | 21.7 | 25.8 |
| 2-4 | 17.4 | 42.6 | 23.3 | 16.7 |
| 3-4 | 16.8 | 36.7 | 24.4 | 22.1 |
| 1-5 | 16.6 | 34.5 | 22.8 | 26.1 |
| 3-5 | 15.2 | 34.7 | 21.5 | 28.6 |
| 1-6 | 13.4 | 34.6 | 24.1 | 27.9 |
| 7 | 19.7 | 36.0 | 18.9 | 25.4 |
| 8 | 19.8 | 36.9 | 16.1 | 27.2 |

In general, the composition of all blends is similar to the composition of roofing asphalts. The blends have somewhat lower saturates content and higher resins content compared with roofing asphalts. The major portion of the saturates in the blends is provided by the asphalt cements and the major portion of the resins is provided by the processed residues. Table 12 shows the whole compositions (including the toluene insolubles) of the blends and roofing asphalts. The overall results show an increase of resins content at the expense of saturates content for the blends compared with conventional roofing asphalts.

I claim:

1. A roofing grade asphalt composition comprising a blend of:
   (a) a processed residue boiling above 524° C. and obtained from high pitch conversion hydrocracking of hydrocarbon oils and
   (b) as a diluent therefor a vacuum residuum having a penetration at 25° C. of 60-400.

2. A composition according to claim 1 wherein the diluent is a paving grade asphalt cement.

3. A composition according to claim 2 wherein the paving grade asphalt cement has a penetration at 25° C. of less than 200.

4. A composition according to claim 2 wherein the paving grade asphalt cement has a penetration at 25° C. of 150-200.

5. A composition according to claim 3 wherein the processed residue is present in the composition in an amount of at least 25% by weight of the total composition.

6. A composition according to claim 3 wherein the hydrocracked pitch is present in the composition in an amount of at least 30% by weight of the total composition.

7. A composition according to claim 2 wherein the pitch conversion is at least 80%.

8. A composition according to claim 2 wherein the heavy hydrocarbon oil is a tar sand bitumen.

* * * * *